United States Patent
Salacinski et al.

(10) Patent No.: US 12,154,362 B2
(45) Date of Patent: Nov. 26, 2024

(54) FRAMEWORK FOR DOCUMENT LAYOUT AND INFORMATION EXTRACTION

(71) Applicant: Bristol-Myers Squibb Company, Princeton, NJ (US)

(72) Inventors: Mark Salacinski, Warren, NJ (US); Christian Joseph Merrill, Bordentown, NJ (US); Octavian Florin Filoti, Portsmouth, NH (US); Irene Yue-Ling Pak, New Brunswick, NJ (US)

(73) Assignee: Bristol-Myers Squibb Company, Princeton, NJ (US)

( * ) Notice: Subject to any disclaimer, the term of this patent is extended or adjusted under 35 U.S.C. 154(b) by 313 days.

(21) Appl. No.: 17/725,313

(22) Filed: Apr. 20, 2022

(65) Prior Publication Data

US 2023/0343126 A1    Oct. 26, 2023

(51) Int. Cl.
| | | |
|---|---|---|
| *G06V 30/414* | (2022.01) | |
| *G06V 10/82* | (2022.01) | |
| *G06V 30/14* | (2022.01) | |
| *G06V 30/146* | (2022.01) | |
| *G06V 30/19* | (2022.01) | |

(52) U.S. Cl.
CPC ............ *G06V 30/414* (2022.01); *G06V 10/82* (2022.01); *G06V 30/1448* (2022.01); *G06V 30/147* (2022.01); *G06V 30/19093* (2022.01)

(58) Field of Classification Search
CPC .. G06V 30/414; G06V 10/82; G06V 30/1448; G06V 30/147; G06V 30/19093; G06V 30/10
See application file for complete search history.

(56) References Cited

U.S. PATENT DOCUMENTS

| | | | |
|---|---|---|---|
| 10,943,105 B2 | 3/2021 | Chen et al. | |
| 11,176,443 B1 * | 11/2021 | Selva | G06F 18/25 |
| 2022/0180113 A1 * | 6/2022 | Patel | G06V 10/28 |
| 2022/0230013 A1 * | 7/2022 | Krishnamurthy | G06V 10/25 |

OTHER PUBLICATIONS

Yang et al. "Learning to Extract Semantic Structure from Documents Using Multimodal Fully Convolutional Neural Networks" IEEE Jul. 21, 2017. Retreived from https://openaccess.thecvf.com/content_cvpr_2017/papers/Yang_Learning_to_Extract_CVPR_2017_paper.pdf.

Tran et al. "Separation of Text and Non-text in Document Layout Analysis using a Recursive Filter". dated Apr. 14, 2015.

Adobe Inc. "PDF Extract API". retreived on Sep. 20, 2021, from https://developer.adobe.com/document-services/docs/overview/.

(Continued)

*Primary Examiner* — Siamak Harandi

(74) *Attorney, Agent, or Firm* — Honigman LLP; Grant Griffith; Jonathan P. O'Brien

(57) ABSTRACT

Provided herein are system, apparatus, device, method, and/or computer program product embodiments, and/or combinations and sub-combinations thereof, for extracting data from a file. Embodiments described herein provide a framework to merge outputs of various models comprising extracted information from a file with its location information and annotated regions of interest into an output file ingestible by a database or knowledge base.

39 Claims, 8 Drawing Sheets

(56) References Cited

OTHER PUBLICATIONS

Soto et al. "Visual Detection with Context for Document Layout Analysis". Dated Nov. 1, 2019, from Conference on Empirical Methods in Natural Language Processing and the 9th International Join Conferenceon Natural Language Processing, p. 3464-3470. DOI: 10.18653/v1/D19-1348.
Patil et al. "READ: Recursive Autoencoders for Document Layout Generation" dated Apr. 16, 2020. from arXiv: 1909.00302v4 [cs.CV]. Retreived from https://arxiv.org/abs/1909.00302.
Oliveria et al. "Fast CNN-based document layout analysis" dated Oct. 22, 2017, IEEE Xplore, retreived from: https://openaccess.thecvf.com/content_ICCV_2017_workshops/papers/w18/Oliveira_Fast_CNN-Based_Document_ICCV_2017_paper.pdf.
Gupta et al. "Document Layout Analysis & Classification and Its Application in OCR" dated Apr. 6, 2006, 10th IEEE.
Binmakhashen et al. "Document Layout Analysis: A Comprehensive Survey" Published Oct. 2019, ACM Computing Surveys, vol. 52, No. 6, Article 109.
Adrian et al. "Document Layout Analysis for Semantic Information Extraction" Published Nov. 2017, DOI: 10.1007/978-3-319-70169-1_20 Conference: Conference of the Italian Association for Artificial Intelligence.
Tran et al. "A robust system for document layout analysis using multilevel homogeneity structure" Published Nov. 1, 2017, published in "Expert systems with Applications" 99-113.

\* cited by examiner

I. Dogs

The dog jumped over the hill. The dog jumped over the hill. The dog jumped over the hill. The dog jumped over the hill. The dog jumped over the hill. The dog jumped over the hill. The dog jumped over the hill. The dog jumped over the hill. The dog jumped over the hill. The dog jumped over the hill. The dog jumped over the hill. The dog jumped over the hill. The dog jumped over the hill. The dog jumped over the hill.

II. Cats

The cat jumped over the hill. The cat jumped over the hill. The cat jumped over the hill. The cat jumped over the hill. The cat jumped over the hill. The cat jumped over the hill. The cat jumped over the hill. The cat jumped over the hill. The cat jumped over the hill. The cat jumped over the hill. The cat jumped over the hill. The cat jumped over the hill. The cat jumped over the hill. The cat jumped over the hill.

FIG. 3

I. Dogs

The dog jumped over the hill. The dog jumped over the hill. The dog jumped over the hill. The dog jumped over the hill. The dog jumped over the hill. The dog jumped over the hill. The dog jumped over the hill. The dog jumped over the hill. The dog jumped over the hill. The dog jumped over the hill. The dog jumped over the hill. The dog jumped over the hill. The dog jumped over the hill.

II. Cats

The cat jumped over the hill. The cat jumped over the hill. The cat jumped over the hill. The cat jumped over the hill. The cat jumped over the hill. The cat jumped over the hill. The cat jumped over the hill. The cat jumped over the hill. The cat jumped over the hill. The cat jumped over the hill. The cat jumped over the hill. The cat jumped over the hill. The cat jumped over the hill.

FIG. 4

Section 1

The dog jumped over the hill. The dog jumped over the hill. The dog jumped over the hill. The dog jumped over the hill. The dog jumped over the hill. The dog jumped over the hill. The dog jumped over the hill. The dog jumped over the hill. The dog jumped over the hill. The dog jumped over the hill. The dog jumped over the hill. The dog jumped over the hill.

502

Section 2

The cat jumped over the hill. The cat jumped over the hill. The cat jumped over the hill. The cat jumped over the hill. The cat jumped over the hill. The cat jumped over the hill. The cat jumped over the hill. The cat jumped over the hill. The cat jumped over the hill. The cat jumped over the hill. The cat jumped over the hill. The cat jumped over the hill.

FRAMEWORK FOR DOCUMENT LAYOUT AND INFORMATION EXTRACTION

BACKGROUND

Information extraction is an important aspect of creating searchable knowledge bases or databases. Furthermore, information extraction and knowledge base creation is the ability to understand the data in a file and extract information from it. The information may be extracted from files such as documents, images, charts, graphs, etc. The files may be in various formats and have various layouts. As a result, it may be difficult to accurately extract data files. Furthermore, it may be challenging to mine files at scale for information that can be processed automatically. Moreover, conventional systems are unable to extract data from a file in a manner similar to how a human reads the file.

SUMMARY

Provided herein are system, apparatus, device, method, and/or computer program product embodiments, and/or combinations and sub-combinations thereof, for extracting information from a file.

A given embodiment includes a method for extracting information. The method includes receiving a file of a first format comprising information and a plurality of regions of interest (ROIs) and converting the file into an image. The method further includes generating, using a first model, a first output comprising a first set of information extracted from the image and a first set of coordinates of the first set of information in the image. The method includes generating, using a second model, a second output comprising a second set of coordinates for each ROI of the plurality of ROIs in the image. The method includes generating, using a third model, a third output comprising a second set of information extracted in the image and a third set of coordinates of the second set of information in the image. The method further includes merging the first output and the third output to generate the information included in the file and a plurality of coordinates. The plurality of coordinates comprises coordinates for the information in the image. The method includes generating an output file of a second format comprising a plurality of sections. Each section of the plurality of sections corresponds to an ROI of the plurality of ROIs, and each section of the plurality of sections is included in the output file based on coordinates of an ROI in the second set of coordinates corresponding to the respective section. The method further includes populating each section of the plurality of sections in the output file with a portion of the information determined to correspond with the respective section based on coordinates corresponding with the portion of the information and the coordinates of the respective section. The second format allows the information in the output file to be searchable while it is rendered on a graphical user interface (GUI) or stored in a data storage device.

In some embodiments, the information comprises one or more words, and generating the first output or third output comprises generating a bounding box around each of the one or more words in the image.

In some embodiments, the third set of coordinates forms a bounding box around each ROI of the plurality of ROIs.

In some embodiments, the first output is generated using optical character recognition (OCR).

In some embodiments, the third output is generated using a neural network.

In some embodiments, the output file is used by one or more machine-learning models to generate a knowledge base.

In some embodiments, the information is selectable in the output file.

In some embodiments, the method further includes causing a display of the output file and the image.

In some embodiments, wherein the information comprises words and/or images. Merging the first output with the third output to generate the information may comprise retaining the images included in the first output. The method may further include identifying one or more words in the first output that share same coordinates with one or more words in the third output and determining a similarity level between the one or more words in the first output and the one or more words in the third output.

The method may further include assigning a first priority value to the first output and a second priority value to the third output. The method may further include including the one or more words from the third output in the plurality of words based on the second priority value of the third output and based on the similarity level being more than a predetermined threshold. The method may further include excluding the one or more words from the first output in the plurality of words based on the first priority value of the first output and based on the similarity level is more than the predetermined threshold. The method may further include identifying a first data type of the one or more words in the first output and a second data type of the one or more words in the second output. The method may further include including the one or more words from the first output in the plurality of words based on the first data type of the one or more words in the first output. The method may further include excluding the one or more words from the third output in the plurality of words based on the second data type of the one or more words in the third output.

Another given embodiment is a system for extracting information. The system comprises a memory comprising instructions and a processor coupled to the memory. The processor is configured to execute the instructions, and the instructions, when executed, cause the processor to receive a file of a first format comprising information and a plurality of regions of interest (ROIs) and convert the file into an image. The instructions, when executed, cause the processor to generate, using a first model, a first output comprising a first set of information extracted from the image and a first set of coordinates of the first set of information in the image. The instructions, when executed, further cause the processor to generate, using a second model, a second output comprising a second set of coordinates for each ROI of the plurality of ROIs in the image. The instructions, when executed, further cause the processor to generate, using a third model, a third output comprising a second set of information extracted in the image and a third set of coordinates of the second set of information in the image. The instructions, when executed, further cause the processor to merge the first output and the third output to generate the information included in the file and a plurality of coordinates. The plurality of coordinates comprises coordinates for the information in the image. The instructions, when executed, further cause the processor to generate an output file of a second format comprising a plurality of sections using the second output. Each section of the plurality of sections corresponds to an ROI of the plurality of ROIs, and each section of the plurality of sections is included in the output file based on coordinates of an ROI in the second set of coordinates corresponding to the respective section. The instructions, when executed, further cause the processor to populate each section of the plurality of sections in the output file with a portion of the information determined to correspond with the respective section based on coordinates corresponding with the portion of the information and the coordinates of the respective section. The second format allows the information in the output file to be searchable while it is rendered on a graphical user interface (GUI) or stored in a data storage device.

In some embodiments, the information comprises one or more words, and generating the first output or third output comprises generating a bounding box around each of the one or more words in the image.

In some embodiments, the third set of coordinates form a bounding box around each ROI of the plurality of ROIs.

In some embodiments, the first output is generated using optical character recognition (OCR).

In some embodiments, the third output is generated using a neural network.

In some embodiments, the output file is used by one or more machine-learning models to generate a knowledge base.

In some embodiments, the information is selectable in the output file.

In some embodiments, the instructions, when executed, further cause the processor to cause a display of the output file and the image.

In some embodiments, wherein the information comprises words and/or images. Merging the first output with the third output to generate the information may comprise retaining the images included in the first output. The instructions, when executed, may further cause the processor to identify one or more words in the first output that share same coordinates with one or more words in the third output and determine a similarity level between the one or more words in the first output and the one or more words in the third output.

In some embodiments, the instructions, when executed, may further cause the processor to assign a first priority value to the first output and a second priority value to the third output. The instructions, when executed, may further cause the processor to include the one or more words from the third output in the plurality of words based on the second priority value of the third output and based on the similarity level being more than a predetermined threshold. The instructions, when executed, may further cause the processor to exclude the one or more words from the first output in the plurality of words based on the first priority value of the first output and based on the similarity level being more than the predetermined threshold. The instructions, when executed, may further cause the processor to identify a first data type of the one or more words in the first output and a second data type of the one or more words in the second output. The instructions, when executed, may further cause the processor to include the one or more words from the first output in the plurality of words based on the first data type of the one or more words in the first output. The instructions, when executed, may further cause the processor to exclude the one or more words from the third output in the plurality of words based on the second data type of the one or more words in the third output.

Another given embodiment includes a non-transitory machine-readable medium having instructions stored thereon that, when executed by at least one computing device, cause the at least one computing device to perform operations comprising. The operations comprise receiving a file of a first format comprising information and a plurality of regions of interest (ROIs) and converting the file into an image. The operations further comprise generating, using a first model, a first output comprising a first set of information extracted from the image and a first set of coordinates of the first set of information in the image. The operations further comprise generating, using a second model, a second output comprising a second set of coordinates for each ROI of the plurality of ROIs in the image. The operations further comprise generating, using a third model, a third output comprising a second set of information extracted in the image and a third set of coordinates of the second set of information in the image. The operations further comprise merging the first output and the third output to generate the information included in the file and a plurality of coordinates. The plurality of coordinates comprises coordinates for the information in the image. The operations further comprise generating an output file of a second format comprising a plurality of sections using the second output. Each section of the plurality of sections corresponds to an ROI of the plurality of ROIs, and each section of the plurality of sections is included in the output file based on coordinates of an ROI in the second set of coordinates corresponding to the respective section. The operations further comprise populating each section of the plurality of sections in the output file with a portion of the information determined to correspond with the respective section based on coordinates corresponding with the portion of the information and the coordinates of the respective section. The second format allows the information in the output file to be searchable while it is rendered on a graphical user interface (GUI) or stored in a data storage device.

In some embodiments, the information comprises one or more words, and generating the first output or third output comprises generating a bounding box around each of the one or more words in the image.

In some embodiments, the third set of coordinates form a bounding box around each ROI of the plurality of ROIs.

In some embodiments, the first output is generated using optical character recognition (OCR).

In some embodiments, the third output is generated using a neural network.

In some embodiments, the output file is used by one or more machine-learning models to generate a knowledge base.

In some embodiments, the information is selectable in the output file.

In some embodiments, the operations further comprise, causing a display of the output file.

In some embodiments, the information comprises words and/or images. Merging the first output with the third output to generate the information comprises retaining the images included in the first output. The operations may further comprise identifying one or more words in the first output that share same coordinates with one or more words in the third output and determining a similarity level between the one or more words in the first output and the one or more words in the third output.

In some embodiments, the operations may further comprise assigning a first priority value to the first output and a second priority value to the third output. The operations may further comprise including the one or more words from the third output in the plurality of words based on the second priority value of the third output and based on the similarity level being more than a predetermined threshold. The operations may further comprise excluding the one or more words from the first output in the plurality of words based on the first priority value of the first output and based on the similarity level being more than the predetermined threshold. The operations may further comprise identifying a first data type of the one or more words in the first output and a second data type of the one or more words in the second output. The operations may further comprise including the one or more words from the first output in the plurality of words based on the first data type of the one or more words in the first output. The operations may further comprise excluding the one or more words from the third output in the plurality of words based on the second data type of the one or more words in the third output.

BRIEF DESCRIPTION OF THE FIGURES

The accompanying drawings, which are incorporated herein and form part of the specification, illustrate the present disclosure and, together with the description, further serve to explain the principles of the disclosure and enable a person skilled in the relevant art to make and use the disclosure.

FIG. 3 illustrates an example image with multiple sections, according to some embodiments.

FIG. 4 illustrates a bounding box around a first section of the image, according to some embodiments.

FIG. 5 illustrates an output file, according to some embodiments.

FIG. 6 illustrates the output file displayed on a graphical user interface (GUI), according to some embodiments.

The drawing in which an element first appears is typically indicated by the leftmost digit or digits in the corresponding reference number. In the drawings, like reference numbers may indicate identical or functionally similar elements.

DETAILED DESCRIPTION

Figure 1:
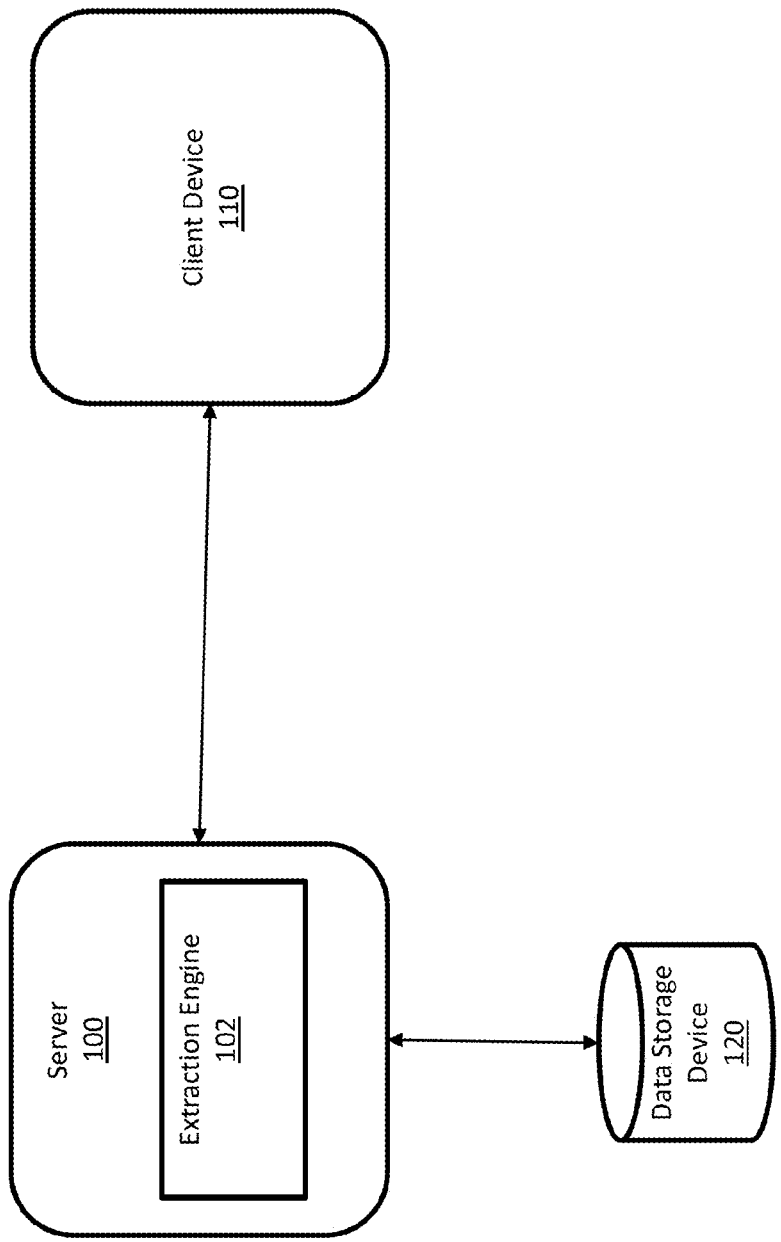
FIG. 1 is a block diagram of a system for extracting information from a file, according to some embodiments.

Provided herein are system, apparatus, device, method, and/or computer program product embodiments, and/or combinations and sub-combinations thereof, for extracting information from a file.

As described above, accurately extracting information from files may be an error-prone and time-consuming process. For example, building a database or knowledge base may require extracting and understanding information from files that may be hundreds or even thousands of pages long. The files may contain text, images, charts, graphs, etc. Furthermore, the files may be in different formats and in various different layouts. In this regard, conventional systems cannot extract data such that it is seamlessly ingestible by a database and knowledge base accurately and effectively.

Embodiments described herein address these challenges by using an image-based process to merge outputs of various models comprising information extracted from a file with its location information and annotated regions of interest into an output file ingestible by a database or knowledge base. This ensures that the output file comprises information that accurately maps back to the original file. Furthermore, the information in the output file is searchable while it is rendered on a GUI or when stored in a data storage device. The information in the output file may also be used to extract knowledge from the information using machine-learning models, which could be then used to populate a database or ontology. As such, the embodiments described herein provide an automated manner to accurately extract information from a file such that it can be efficiently accessed.

In a given embodiment, a server receives a file of a first format comprising information and a plurality of regions of interest (ROIs). The server converts the file into an image. Furthermore, the server generates, using a first model, a first output comprising a first set of information extracted from the image and a first set of coordinates of the first set of information in the image. The server generates, using a second model, a second output comprising a second set of coordinates for each ROI of the plurality of ROIs in the image. Moreover, the server generates, using a third model, a third output comprising a second set of information extracted in the image and a third set of coordinates of the second set of information in the image. The server further merges the first output and the third output to generate the information included in the file and a plurality of coordinates. The plurality of coordinates comprises coordinates for the information in the image. The server generates an output file of a second format comprising a plurality of sections using the second output. Each section of the plurality of sections corresponds to an ROI of the plurality of ROIs, and each section of the plurality of sections is included in the output file based on coordinates of an ROI in the second set of coordinates corresponding to the respective section. Furthermore, the server populates each section of the plurality of sections in the output file with a portion of the information determined to correspond with the respective section based on coordinates corresponding with the portion of the information and the coordinates of the respective section. The second format allows the information in the output file to be searchable while it is rendered on a graphical user interface (GUI) or stored in a data storage device.

Embodiments described herein generate an output file that comprises information (e.g., text, images, charts, graphs) that is accurately extracted from a file and sectioned based on the regions of interest from where the information was extracted. Embodiments described herein improve the accuracy of the information extracted from files by organizing the information in logical sections extracted from the file without existing organizational metadata. Furthermore, the information is extracted in its intended order. Moreover, extraneous information such as headers, footers, page numbers, copyright, table of contents, etc., may be excluded from the output file.

The output file may be displayed for a user. Additionally, the output file may be ingestible by the database such that the information extracted from the file and its location in the file may be effectively searched. Furthermore, other machine-learning models may identify knowledge using the information in the output file when generating a knowledge base.

FIG. 1 is a block diagram of a system for extracting data from a file, according to some embodiments. The system may include a server 100, client device 110, and data storage device 120. The devices of the system may be connected through a network. For example, the devices of the system may be connected through wired connections, wireless connections, or a combination of wired and wireless connections. In an example embodiment, one or more portions of the network may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks. Alternatively, server 100, client device 110, and data storage device 120 may be located on a single physical or virtual machine.

In some embodiments, server 100 and data storage device 120 may reside in a cloud-computing environment. In other embodiments, server 100 may reside in a cloud-computing environment, while data storage device 120 resides outside the cloud-computing environment. Furthermore, in other embodiments, server 100 may reside outside the cloud-computing environment, while data storage device 120 resides in the cloud-computing environment.

Data storage device 120 may be one or more databases that are configured to store structured and/or unstructured data. Data storage device 120 may store files from which information is to be extracted, output files, training files for training a model to extract a page layout, etc.

In some embodiments, a user may use client device 110 to transmit or upload a file for information extraction to server 100. Alternatively, client device 110 may transmit a request for a server to extract information from one or more files stored in database 120.

Server 100 may receive the file from client device 110. Alternatively, server 100 may retrieve the one or more files from database 120, as indicated in the request transmitted by client device 110.

Server 100 may comprise extraction engine 102. Extraction engine 102 may convert the file into an image. Extraction engine 102 may implement one or more models to extract information from a given file. Furthermore, extraction engine 102 may merge the outputs from the one or more models to generate an output file that comprises the extracted information organized in logical sections extracted from the file. The output file may be stored in database 120 such that the information in the output file may be searched. The extraction and generation of the output file will be described in further detail with respect to FIG. 2.

Figure 2:
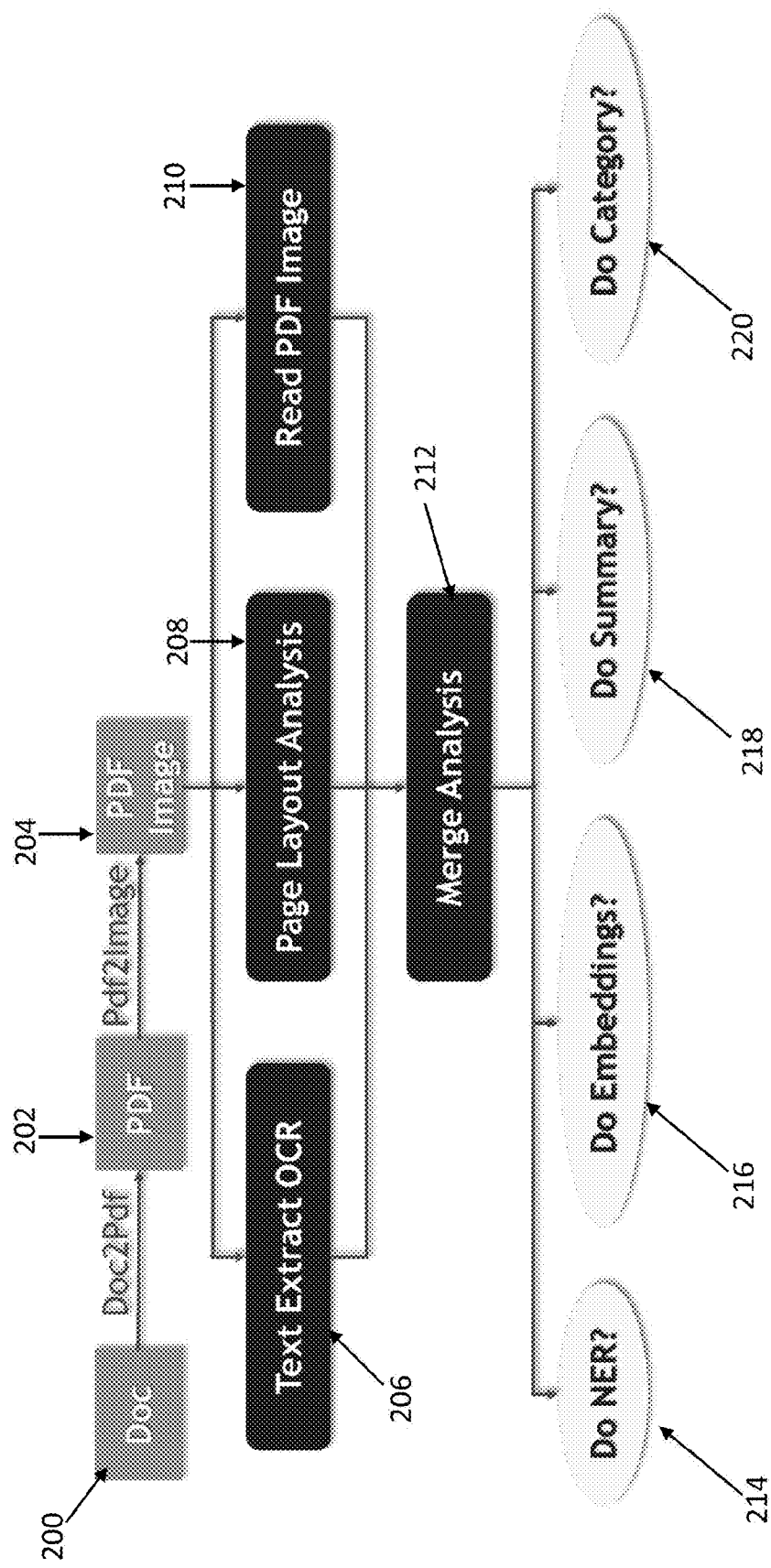
FIG. 2 is a block diagram of data flow in the system for extracting information from a file, according to some embodiments.

FIG. 2 is a block diagram of data flow in the system for extracting information from a file, according to some embodiments. FIG. 2 shall be described with reference to FIG. 1.

In some embodiments, server 100 may receive file (e.g., document) 200 and a request to extract information from file 200. Alternatively, server 100 may retrieve file 200 from database 120 in response to receiving a request to extract information from file 200 from client device 110. File 200 may comprise information, including text (e.g., words), images, charts, graphs, etc.

Extraction engine 102 may determine whether the file is in a common format. A common format may be, for example and without limitation, Portable Document Format (PDF). If the file is not in the common format, extraction engine 102 may convert the file into the common, (e.g., PDF) format, resulting in a file 202. As a non-limiting example, extraction engine 102 may use C# to convert a non-PDF file into a PDF format. While the rest of this disclosure will refer to PDF as the common format, a person of skill in the art will understand that other common formats may instead be used.

Additionally, extraction engine 102 may render/convert each page of PDF file 202 into an image, resulting in image 204. As a non-limiting example, extraction engine 102 may implement PyMuPDF to render/convert each page of PDF file 202 into an image. Extraction engine 102 also maintains a list of each image page in PDF file 202. This allows for an unlimited number of pages to be analyzed in PDF file 202.

Extraction engine 202 may implement various models to extract information from image 204. For example, extraction engine 202 may implement text extract optical character recognition (OCR) model 206, page layout analysis model 208, and read PDF image model 210. Extraction engine 202 may run additional or fewer models to extract the information from image 204. Extraction engine 202 may concurrently, or in parallel, transmit image 204 to text extract OCR model 206, page layout analysis model 208, and read PDF image model 210 to extract information from image 204.

Text extract OCR model 206 may execute an OCR process on image 204 to extract the text from image 204 and each word within the text respective locations in image 204. Text extract OCR model 206 may extract the text and its respective location in image 204. For example, text extract OCR model 206 may generate a bounding box surrounding each word in image 204. Text extract OCR model 206 may identify the coordinates for the bounding box. As a non-limiting example, text extract OCR model 206 may implement one or more of AMAZON TEXTRACT, TESERACT, GOOGLE VISION, MICROSOFT AZURE READ API, etc. Text extract OCR model 206 may generate a first output. The first output comprises information (e.g., text) detected in image 204 and a first set of coordinates identifying the location of the information detected in image 204.

Page layout analysis model 208 may identify ROIs in image 204. ROIs may be sections in image 204, such as title, abstract, chapters, paragraphs, tables, images, etc. Page layout analysis model 208 may implement a neural network to identify the ROI in image 204. As a non-limiting example, the neural network may be a convolutional neural network (CNN), such as fast R-CNN, faster R-CNN, Inception, etc.

The neural network may be trained to identify the ROIs in images that have varying page layouts. For example, the CNN may be trained in two phases, a forward phase and a backward phase. The forward phase may include convolution layer(s), pooling layer(s), and fully connected layer. To train the CNN, extraction engine 102 may instruct the CNN to identify the ROIs of an input image of training files retrieved from database 120.

The convolution layer may apply filters to an input image to generate a feature map. Particularly, in the convolution layer, the CNN may execute feature extraction on the input image. The features may include portions of the input image. For example, the features may be different edges or shapes of the input image. The CNN may extract different types of features to generate different types of feature maps. For example, the CNN may apply an array of numbers (e.g., kernel) across the different portions of the input image. The kernel may also be referred to as a filter. As indicated above, different types of filters may be applied to the input image to generate different feature maps. For example, the filter for identifying a shape in the input image may be different from the filter for edge detection. Therefore, different kernels may be applied for identifying a shape in the input image as compared to edge detection. Each kernel may include a different array of numbers. The values of the filters or kernels may be randomly assigned and optimized over time (e.g., using a gradient descent algorithm). The kernel may be applied as a sliding window across different portions of the input image. The kernel may be summed with a given portion of the input image to generate an output value. The output value may be included in a feature map. The feature maps may include an output value from the different kernels applied to each portion of the input image. The generated feature maps may be a two-dimensional array.

The pooling layer may generate a reduced feature map. Particularly, in the pooling layer, the CNN may reduce the dimensionality of each feature map generated in the convolution layer. The CNN may extract portions of a given feature map and discard the rest. Pooling the image keeps the important features while discarding unimportant features. For example, a feature map may include activated areas and non-activated areas. Activated areas may include detected features, while non-activated areas may indicate that the portion of the image did not include a feature. Pooling may remove the non-activated areas. This way, the size of the image is reduced. The CNN may use max or average pooling in the pooling layer to perform these operations. Max pooling keeps the higher values of portions of the feature map while discarding the remaining values. Average pooling keeps the average value of different portions of the feature map. Therefore, the CNN may generate a reduced feature map for each of the feature maps generated in the convolution layer.

The CNN may include additional convolution layers. In the additional convolution layers, the CNN may generate additional feature maps based on the reduced feature maps generated in the pooling layer. Furthermore, the CNN may include additional pooling layers. In the additional pooling layers, the CNN may generate further reduced feature maps based on the feature maps generated in the additional convolution layers.

The convolution layers may also apply a Rectified Linear Unit (ReLU) function to the input image. The ReLU function is applied to the input image to remove the linearity from the input image. For example, the ReLU function may remove all the black elements from the input image and keep only the grey and white colors. This causes the color to change more abruptly in the input image, which removes the linearity from the input image.

The convolution and pooling layers may be used for feature learning. Feature learning allows the CNN to identify desired features in the input image and, therefore, accurately classify the input image. Therefore, by optimizing the convolution and pooling layers, the CNN may apply the correct filters on the input image to extract the necessary features needed to classify the input image.

The fully connected layer may then classify the features of the image using weights and biases to generate an output. The CNN may identify the ROIs in the input image. The fully connected layer may generate a bounding box around the identified ROIs. Furthermore, the fully connected layer may identify coordinates of the identified ROIs in the input image.

Particularly, in the fully connected layer, the CNN may flatten the reduced feature maps generated in the pooling layers into a one-dimensional array (or vector). The fully connected layer is a neural network. The CNN may execute a linear transformation on the one-dimensional array. The CNN may perform the linear transformation by applying weights and biases to the one-dimensional array. Initially, the weights and biases are randomly initialized and may be optimized over time. The CNN may perform a non-linear transformation such as an activation layer function (e.g., softmax or sigmoid) to identify the ROIs of the input image.

In the backward phase, the CNN may use backpropagation to determine whether the CNN was able to identify the ROI correctly. Backpropagation includes optimizing the input parameters such that the CNN may more accurately classify documents. The input parameters may include values for the kernels, weights, biases, or the like. Gradient descent may be used to optimize the parameters. In particular, gradient descent may be used to optimize the CNN's identification of the ROIs in the input image.

Gradient descent is an iterative process to optimize the CNN. Gradient descent may update the parameters of the CNN and cause the CNN to identify each ROI in the input image based on the updated parameters and validate the identification of the ROIs in the input image.

To this end, in some aspects, the CNN may use backpropagation to validate its classification of the input image. Particularly, in some aspects, a subject matter expert (e.g., pathologist) can determine whether model 104 correctly identified the ROIs in the input image. The subject matter expert may provide their feedback regarding the accuracy of the identified ROIs. Alternatively or in addition to this feedback, the CNN may verify the identified ROIs using metadata associated with each image. For example, the metadata may be correctly identified ROIs for the input image.

The CNN may compare the identified ROIs in the input image by the CNN with the information included in the metadata or feedback provided by the subject matter expert. Based on the comparison, the CNN may update the values for the filters, weights, and biases using a gradient descent algorithm and re-execute the forward phase on the input image.

Extraction engine 102 may instruct the CNN to identify the ROIs of each image in the training files, including the different versions of each image. The CNN iteratively optimizes its parameters, identifies each image's ROIs in the training files via the forward phase, and verifies the ROIs via the backward phase until it reaches the desired accuracy threshold.

Once the CNN reaches the desired accuracy threshold, the CNN may be considered fully trained. Once the CNN is fully trained, page layout analysis model 208 may identify the ROIs in image 204 using the CNN. The CNN may also identify and extract an identifier for the ROIs in image 204. Page layout analysis model 208 may generate a second output comprising a second set of coordinates for each ROI in image 204 and the identifiers of the ROIs using the CNN. The CNN may be continuously refined after identifying the ROIs for a given image based on feedback received from users.

In some embodiments, page layout analysis model 208 may use a faster R-CNN using image segmentation, which detects and localizes the ROI in image 204. The ROI may be tables, figures, paragraphs, section titles, etc.

Read PDF image model 210 may detect and extract the text in image 204. As a non-limiting example, read PDF image model 210 uses PyMuPDF to extract the text from image 204. Read PDF image model 210 may output a bounding box for each detected word in image 204. If read PDF image model 210 encounters information in image 204 that is not a word, read PDF image model 210 extracts the pixel information. Read PDF image model 210 generates a third output comprising a second set of words detected in image 204 and a third set of coordinates of each respective word of the third set of words in image 204.

Extraction engine 102 may also implement merge analysis model 212. Merge analysis model 212 may be configured to merge the first, second, and third output to generate an output file. Specifically, the first output from text extract OCR model 206 and the third output from read PDF image model 210 may comprise the text from image 204 and the respective coordinates of the text in image 204. There may be some or significant overlap in the first output and third output. That is, text extract OCR model 206 and read PDF image model 210 extracted information from the same locations in image 204. Merge analysis model 212 may need to determine which information is to be retained and which information is to be discarded.

To this end, merge analysis model 212 may assign a priority to the information in the first output and third output. For example, if merge analysis model 212 determines that text extract OCR model 206 and read PDF image model 210 extracted text from the same location in image 204, merge analysis model 212 may determine a similarity level of the text in the first output at the given location in image 204 and the text in the third output at the given location in image 204. For example, merge analysis model 212 may determine how similar the words in the text are in the first output at the given location in image 204 and the text in the third output at the given location in image 204.

Merge analysis model 212 may also determine a data type of the extracted information in the first output and second output. For example, if the text does not include any embedded fonts or images (e.g., the text is raw text), and the similarly level of more than a predetermined threshold, merge analysis model 212 may retain the text from the third output (e.g., from read pdf image model 210) and discard the text from the first output (e.g., from text extract OCR model 206). If the text includes embedded fonts or images, merge analysis model 212 may retain the text from the first output (e.g., from text extract OCR model 206) and discard the text from the third output (e.g., from read pdf image model 210). For any extracted information that may be images, charts, graphs, etc., merge analysis model 212 may retain the information from the first output (e.g., from text extract OCR model 206) and discard the information from the third output (e.g., from read pdf image model 210). By merging the first and second output, merge analysis model 212 may generate the complete content of image 204 in its accurate location or desired order.

Merge analysis model 212 may generate an output file comprising sections. Each section corresponds to an identified ROI from the second output. The sections may be organized in the output file based on the coordinates of the ROI and the identifier of the ROI, as indicated in the second output. For example, if image 204 includes chapter 1 and chapter 2, the second output may include coordinates of chapter 1 and chapter 2 in image 204. Merge analysis model 212 may use the coordinates of chapter 1 and chapter 2 in the second output to generate a first section and second section in the output file.

Merge analysis model 212 may populate the sections in the output file with the information extracted from image 204. That is, merge analysis model 212 may use the information from the first and second output, as merged by merge analysis model 212, the coordinates of the information in image 204, as indicated in the first and second output, and the coordinates of the ROI, as indicated in the third output, to populate each section of the output file with information determined to correspond with the respective section.

In some embodiments, the first or third output may comprise text from images, charts, or tables in image 204. The second output may comprise coordinates for the images, charts, or tables. Merge analysis model 212 may populate the sections in the output file that correspond with the images, charts, or tables in the second output with the text extracted from the images, charts, or tables in the first or third output.

The output file may comprise information extracted from image 204 organized in logical sections extracted from image 204. The output file may also include the coordinates for the information and the logical sections as mapped to image 204. The output file may also have symbols indicating spaces, paragraphs, tabs, indentations, etc. that are included in the information. In some embodiments, text extract OCR model 206, page layout analysis model 208, and read PDF image model 210 may be configured to exclude headers, footers, table of contents, and other information, which may not be of relevance to a user.

The output file may be a JavaScript Object Notation (JSON) file. As such, the output file may be human-readable. Furthermore, other machine-learning models may use the output file for further processing. Particularly, the machine-learning models may identify/extract knowledge from the output file and build a knowledge base using the output file. The machine-learning models may be on or more of name entity recognition (NER) model 214, embeddings model 216, summery generation model 218, categorization model 220, etc.

In some embodiments, the output file may be stored in data storage device 120. The information of the output file may be queried. Since the output file includes the coordinates of the information in image 204, a user may also query the output file to locate the information in image 204.

FIG. 3 illustrates an example image with multiple sections, according to some embodiments. FIG. 3 will be described with reference to FIGS. 1 and 2.

Image 300 may be a file that extraction engine 102 converted into image 300. Image 300 may comprise text divided into two sections, a first section 304 and a second section 306. First section 304 may be a section including text about dogs. Second section 306 may be a section including text about cats.

Extraction engine 102 may instruct text extract OCR model 206, page layout analysis model 208, and read PDF image model 210 to extract the information from image 300. In this scenario, the information may be the text about the dogs and cats.

Each of text extract OCR model 206 and read PDF image model 210 may detect and extract the text from image 300. Furthermore, each of text extract OCR model 206 and read PDF image model 210 may generate a bounding box around each detected word. For example, each of text extract OCR model 206 and read PDF image model 210 may generate bounding box 302 around the word "jumped." Moreover, each of text extract OCR model 206 and read PDF image model 210 may determine the coordinates of bounding box 302 in image 300. The coordinates may be in the following format: (x, y), where x and y are pixels in image 300. Each of text extract OCR model 206 and read PDF image model 210 may extract the word "jumped" and the coordinates of bounding box 302. Each of text extract OCR model 206 and read PDF image model 210 may include the extracted words and coordinates in the first and third output, respectively.

FIG. 4 illustrates a bounding box around first section 304 of image 300, according to some embodiments. FIG. 4 will be described with reference to FIGS. 1-3.

As described above, extraction engine 102 may instruct page layout analysis model 208 to identify the ROIs of image 300. The ROIs may be first section 304 and second section 306. Page layout analysis model 208 may use a neural network, such as CNN, to identify section first section 304 and second section 306 in image 300.

For example, page layout analysis model 208 may generate a bounding box 400 around first section 304 in response to identifying first section 304. Page layout analysis model 208 may determine the coordinates of bounding box 400 in image 300. Furthermore, page layout analysis model 208 may determine an identifier of first section 304 (e.g., "I. Dogs"). Page layout analysis model 208 may include the coordinates of bounding box 400 and the identifier of first section 304 in the second output.

FIG. 5 illustrates an output file, according to some embodiments. FIG. 5 will be described with reference to FIGS. 1-4.

Merge analysis model 212 may generate output file 500 using a first output text extract OCR model 206, a second output generated by page layout analysis model 208, and a third output generated by read PDF image model 210. Specifically, merge analysis module 212 may merge the extracted text and coordinates of the bounding boxes of the extracted text in the first and second outputs to generate the information contained in image 300.

Furthermore, merge analysis model 212 may generate section 502 and section 504 in output file 500 using the third output. Section 502 may correspond with first section 304 in image 300. Section 504 may correspond with second section 306 in image 300. Merge analysis model 212 may generate section 502 based on coordinates for the bounding box of first section 304 (e.g., bounding box 400) and first section 304's identifier and section 504 based on coordinates for the bounding box of second section 306 and second section 306's identifier.

Merge analysis model 212 may identify the text from the merged text that corresponds with section 502 based on the coordinates of the text and the coordinates of first section 304. Merge analysis model 212 may populate section 502 with the corresponding text. Similarly, merge analysis model 212 may identify the text from the merged text that corresponds with section 504 based on the coordinates of the text and the coordinates of second section 306. Merge analysis model 212 may populate section 504 with the corresponding text.

Figure 6:
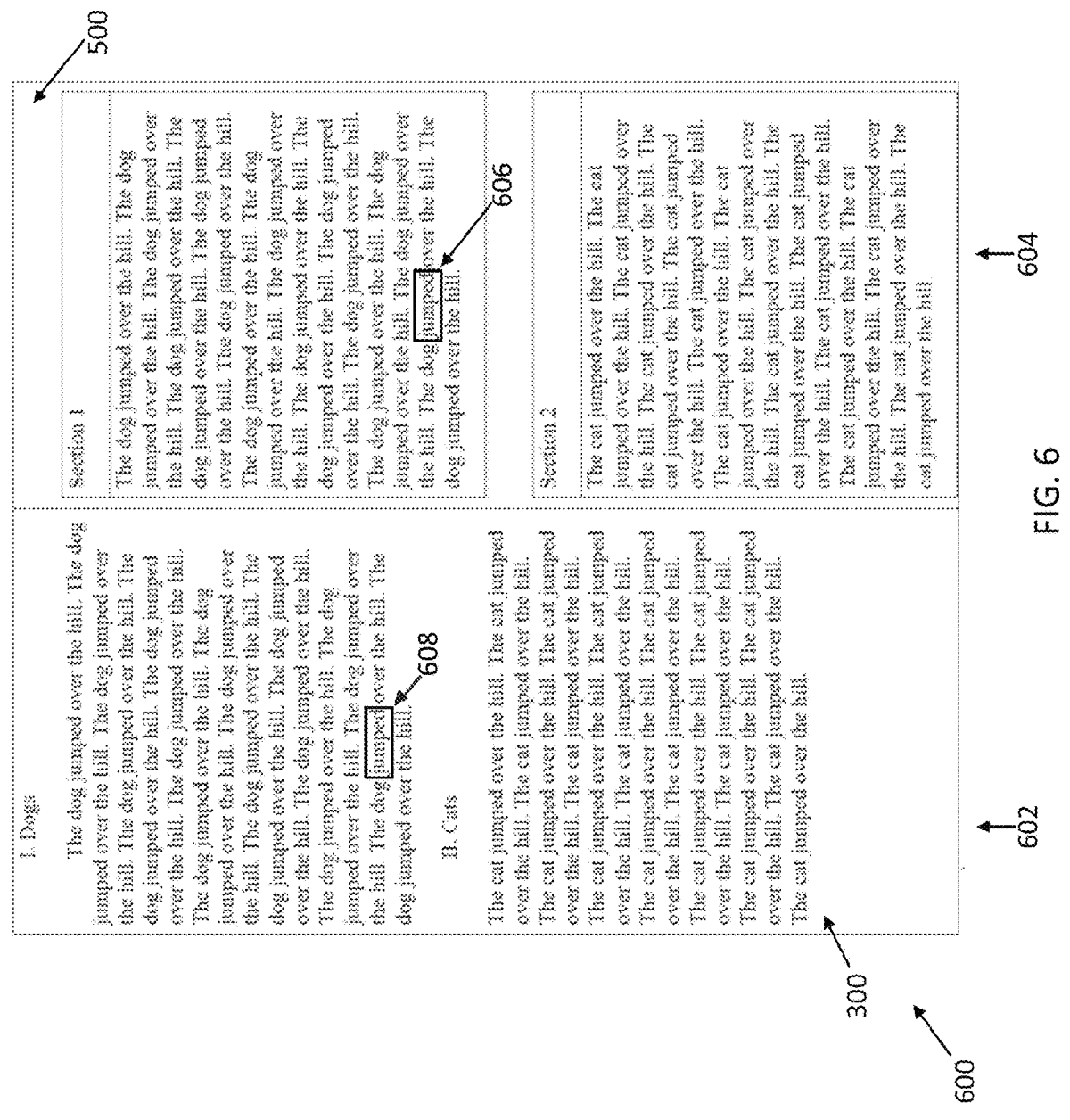

FIG. 6 illustrates the output file displayed on a graphical user interface (GUI), according to some embodiments. FIG. 6 will be described with reference to FIGS. 1-5.

A user may use client device 110 to display output file 500 on GUI 600. GUI 600 may include portion 602 and portion 604. Portion 602 may include image 300, and portion 604 may include output file 500.

The text in output file 500 may be selectable and searchable. Furthermore, output file 500 may comprise the coordinates of the text in image 300. As such, the text in output file 500 may be mapped to the relevant portions of image 300. If a user selects the word "jumped" 606 in output file 500, the corresponding word 608 can be highlighted in image 300 based on the coordinates of the "jumped" word 608 in image 300. This way, image 300 may be effectively searched using output file 500.

In another example, image 300 may be displayed on GUI 600, and output file 500 may not be displayed on GUI 600. However, when a user attempts to search image 300, the search may be executed against output file 500, and the relevant elements of image 300 may be highlighted based on the search results.

Figure 7:
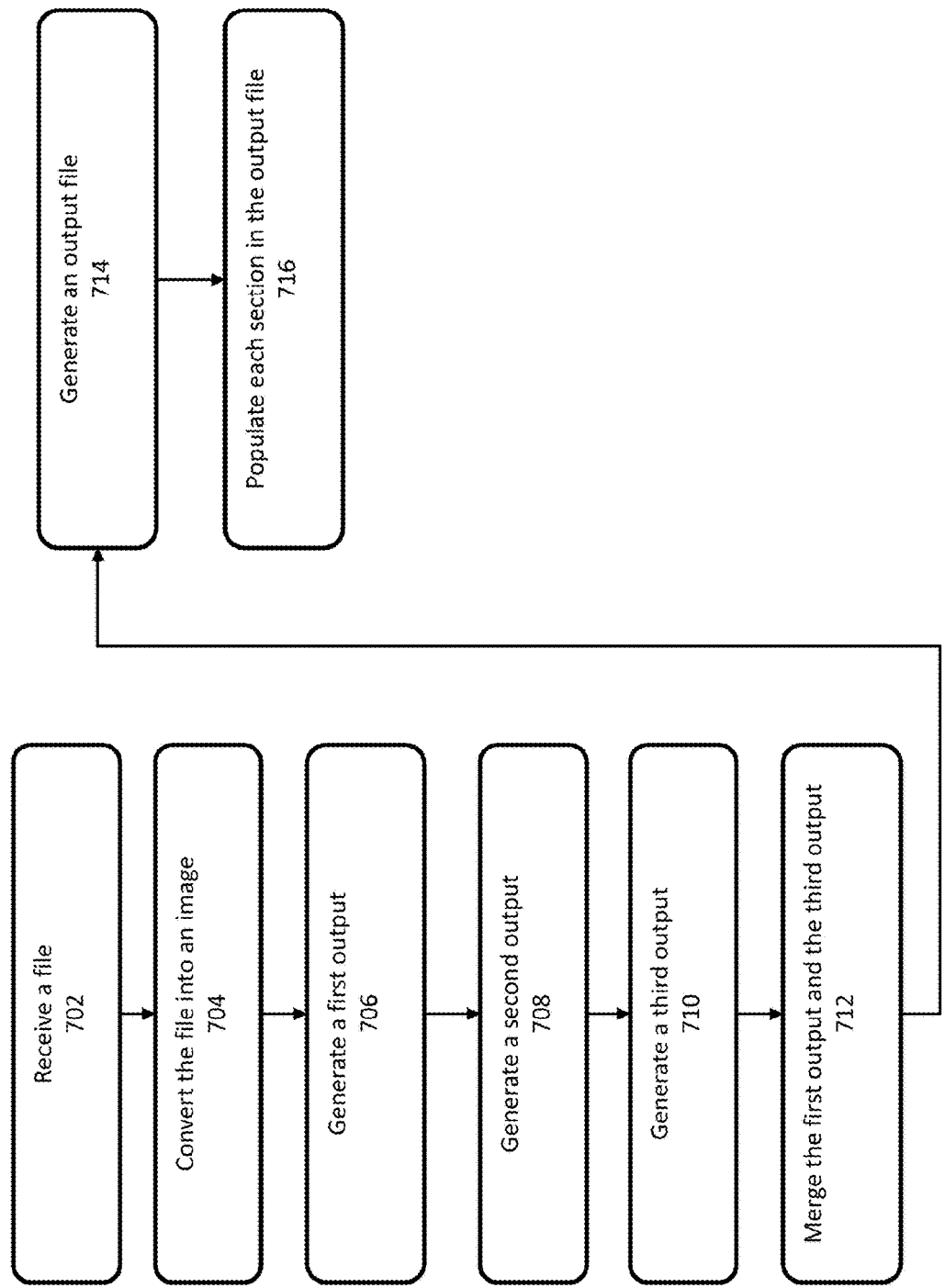
FIG. 7 is a flowchart illustrating the process for extracting information from a file, according to some embodiments.

FIG. 7 is a flowchart illustrating the process for extracting information from a file, according to some embodiments. Method 700 may be performed by processing logic that may comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously or in a different order than shown in FIG. 7, as will be understood by a person of ordinary skill in the art.

Method 700 shall be described with reference to FIGS. 1 and 2. However, method 700 is not limited to that example embodiment.

In operation 702, server 100 receives file 200 comprising information and a plurality of regions of interest (ROIs). The information may be text, images, graphs, charts, etc. The ROIs may be sections of the file, such as title, abstract, chapters, sections, etc. The file may be received from client device 110 with a request to extract the information from the file.

In operation 704, extraction engine 102 converts the file into image 204. Extraction engine 102 may determine whether file 200 is a PDF. If not, extraction engine 102 may convert file 200 into a PDF file 202. Furthermore, extraction engine 102 may convert PDF file 202 into image 204.

In operation 706, extraction engine 102 generates a first output comprising a first set of information extracted from image 204 and a first set of coordinates of the first set of information in image 204. Extraction engine 102 may instruct text extract OCR model 206 to generate the first output. Text extract OCR model 206 may use OCR to extract the first set of information and the first set of coordinates of the first set of information. For example, the first set of coordinates may be of bounding boxes surrounding each word, image, chart, graph, etc. The first set of coordinates indicates the locations of the information in image 204.

In operation 708, extraction engine 102 generates a second output comprising a second set of coordinates for each ROI of image 204. Extraction engine 102 may instruct page layout analysis model 208 to detect and identify a set of coordinates for each ROI. Page layout analysis model 208 may implement a neural network to detect and identify each ROI in image 204. Page layout analysis model 208 may create a bounding box around each ROI in image 204. The second set of coordinates may correspond to the bounding boxes in image 204. The second set of coordinates indicates the ROIs' location in image 204.

In operation 710, extraction engine 102 generates a third output comprising a second set of information extracted in the image and a third set of coordinates of the second set of information in the image. Extraction engine 102 may instruct read PDF image model 210 to generate the third output. For example, the third set of coordinates may be of bounding boxes surrounding each word, image, chart, graph, etc.

In operation 712, extraction engine 102 merges the first output and the third output to generate the information included in the file and a plurality of coordinates. The plurality of coordinates comprises coordinates for the information in the image. Extraction engine 102 may instruct merge analysis model 212 to merge the first and third output to generate the information.

In operation 714, extraction engine 102 generates an output file comprising sections. Merge analysis model 212 may generate the output file. Each section corresponds to an ROI of image 204. Each section is included in the output file based on coordinates of an ROI corresponding to the respective section.

In operation 716, extraction engine 102 populates each section in the output file with a portion of the information determined to correspond with the respective section based on coordinates corresponding with the portion of the information and the coordinates of the respective section. Merge analysis model 212 may populate the sections of the output file. The output file may comprise the information extracted from the file and logically organized like the file. Furthermore, the output file may be searchable.

Figure 8:
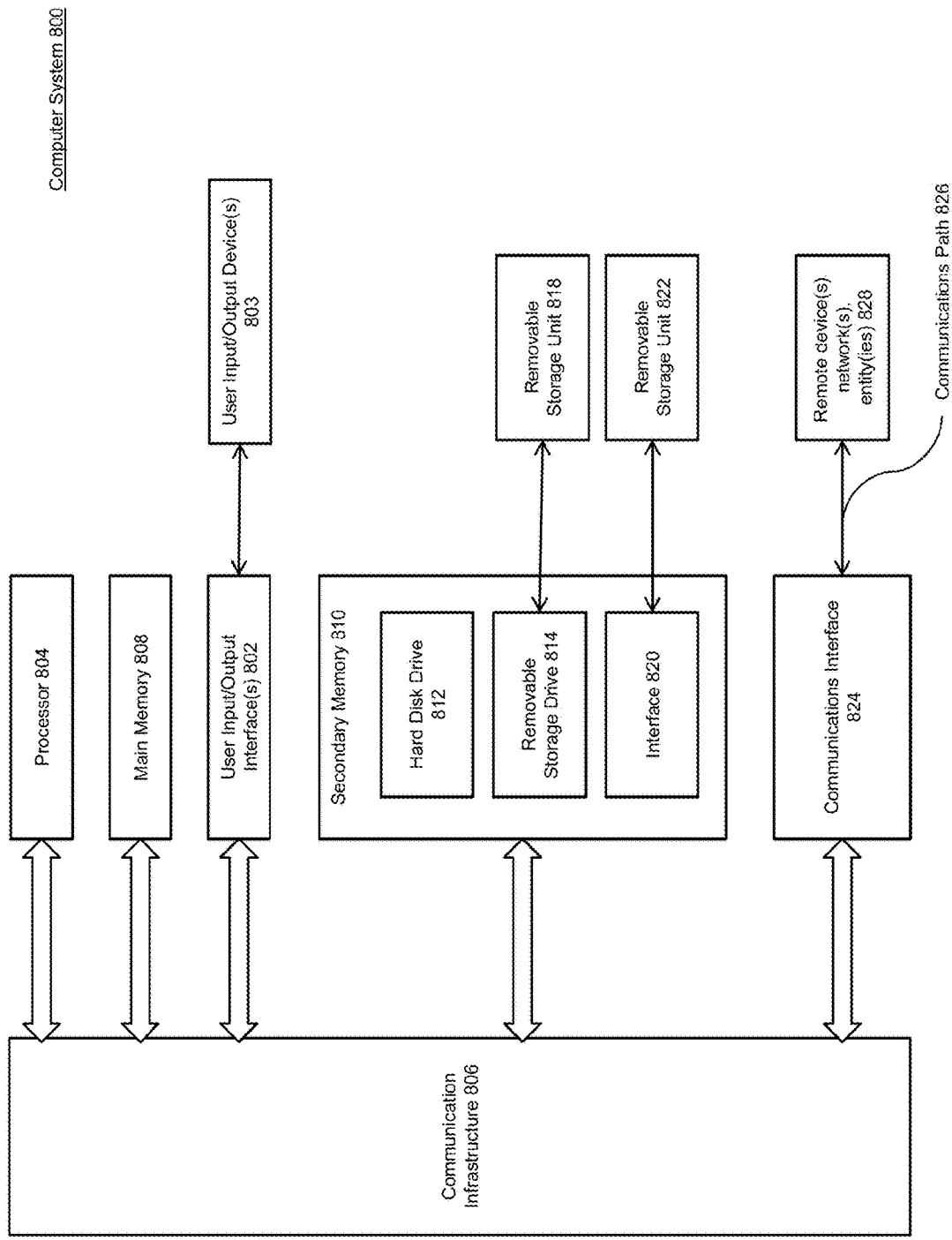
FIG. 8 is a block diagram of example components of a device according to an embodiment.

Various embodiments can be implemented, for example, using one or more computer systems, such as computer system 800 shown in FIG. 8. Computer system 800 can be used, for example, to implement method 700 of FIG. 7. Furthermore, computer system 800 can be at least part of server 100, client device 110, and data storage device 120, as shown in FIG. 1. For example, computer system 800 route communication to various applications. Computer system 800 can be any computer capable of performing the functions described herein.

Computer system 800 can be any well-known computer capable of performing the functions described herein.

Computer system 800 includes one or more processors (also called central processing units, or CPUs), such as a processor 804. Processor 804 is connected to a communication infrastructure or bus 806.

One or more processors 804 can each be a graphics processing unit (GPU). In an embodiment, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communication infrastructure 806 through user input/output interface(s) 802.

Computer system 800 also includes a main or primary memory 808, such as random access memory (RAM). Main memory 808 can include one or more levels of cache. Main memory 808 has stored therein control logic (i.e., computer software) and/or data.

Computer system 800 can also include one or more secondary storage devices or memory 810. Secondary memory 810 can include, for example, a hard disk drive 812 and/or a removable storage device or drive 814. Removable storage drive 814 can be a floppy disk drive, a magnetic tape drive, a compact disk drive, an optical storage device, tape backup device, and/or any other storage device/drive.

Removable storage drive 814 can interact with a removable storage unit 818. Removable storage unit 818 includes a computer usable or readable storage device having stored thereon computer software (control logic) and/or data. Removable storage unit 818 can be a floppy disk, magnetic tape, compact disk, DVD, optical storage disk, and/any other computer data storage device. Removable storage drive 814 reads from and/or writes to removable storage unit 818 in a well-known manner.

According to an exemplary embodiment, secondary memory 810 can include other means, instrumentalities, or other approaches for allowing computer programs and/or other instructions and/or data to be accessed by computer system 800. Such means, instrumentalities, or other approaches can include, for example, a removable storage unit 822 and an interface 820. Examples of the removable storage unit 822 and the interface 820 can include a program cartridge and cartridge interface (such as that found in video game devices), a removable memory chip (such as an EPROM or PROM) and associated socket, a memory stick, and USB port, a memory card, and associated memory card slot, and/or any other removable storage unit and associated interface.

Computer system 800 can further include a communication or network interface 824. Communication interface 824 enables computer system 800 to communicate and interact with any combination of remote devices, remote networks, remote entities, etc. (individually and collectively referenced by reference number 828). For example, communication interface 824 can allow computer system 800 to communicate with remote devices 828 over communications path 826, which can be wired and/or wireless, and which can include any combination of LANs, WANs, the Internet, etc. Control logic and/or data can be transmitted to and from computer system 800 via communication path 826.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc., using orderings different than those described herein.

References herein to "one embodiment," "an embodiment," "an example embodiment," or similar phrases indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other but yet still co-operate or interact with each other.

The breadth and scope of this disclosure should not be limited by any of the above-described exemplary embodiments but should be defined only in accordance with the following claims and their equivalents.

What is claimed is:

1. A method for extracting information, the method comprising:
receiving, by a processor, a file comprising information and a plurality of regions of interest (ROIs), wherein the file is in a first format;
converting, by the processor, the file into an image;
generating, by the processor, using a first model, a first output comprising a first set of information extracted from the image and a first set of coordinates of the first set of information in the image;
generating, by the processor, using a second model, a second output comprising a second set of coordinates for each ROI of the plurality of ROIs in the image;
generating, by the processor, using a third model, a third output comprising a second set of information extracted from the image and a third set of coordinates of the second set of information the image;
merging, by the processor, the first output and the third output to generate the information included in the file and a plurality of coordinates, wherein the plurality of coordinates comprise coordinates for the information in the image;
generating, by the processor, an output file of a second format comprising a plurality of sections using the second output, wherein each section of the plurality of sections corresponds to an ROI of the plurality of ROIs, and each section of the plurality of sections is included in the output file based on coordinates of an ROI in the second set of coordinates corresponding to the respective section; and
populating, by the processor, each section of the plurality of sections in the output file with a portion of the information determined to correspond with the respective section based on coordinates corresponding with the portion of the information and the coordinates of the respective section,
wherein the second format allows the information in the output file to be searchable while it is rendered on a graphical user interface (GUI) or stored in a data storage device.

2. The method of claim 1, wherein the information comprises one or more words and generating the first output or third output comprises generating a bounding box around each of the one or more words in the image.

3. The method of claim 1, wherein the third set of coordinates form a bounding box around each ROI of the plurality of ROIs.

4. The method of claim 1, wherein the first output is generated using optical character recognition (OCR).

5. The method of claim 1, wherein the third output is generated using a neural network.

6. The method of claim 1, wherein one or more machine-learning models use the output file to generate a knowledge base.

7. The method of claim 1, wherein the information is selectable in the output file.

8. The method of claim 1, further comprising, causing display, by the processor, of the output file and the image.

9. The method of claim 1, wherein the information comprises words and/or images.

10. The method of claim 9, wherein merging the first output with the third output to generate the information, comprises retaining the images included in the first output.

11. The method of claim 9, further comprising:
identifying, by the processor, one or more words in the first output that share same coordinates with one or more words in the third output; and
determining, by the processor, a similarity level between the one or more words in the first output and the one or more words in the third output.

12. The method of claim 11, further comprising:
assigning, by the processor, a first priority value to the first output and a second priority value to the third output;
including, by the processor, the one or more words from the third output in the plurality of words based on the second priority value of the third output and based on the similarity level being more than a predetermined threshold; and
excluding, by the processor, the one or more words from the first output in the plurality of words based on the first priority value of the first output and based on the similarity level being more than the predetermined threshold.

13. The method of claim 11, further comprising:
identifying, by the processor, a first data type of the one or more words in the first output and a second data type of the one or more words in the third output;
including, by the processor, the one or more words from the first output in the plurality of words based on the first data type of the one or more words in the first output; and
excluding, by the processor, the one or more words from the third output in the plurality of words based on the second data type of the one or more words in the third output.

14. A system for extracting information, the system comprising:
a memory comprising instructions; and
a processor coupled to the memory, wherein the processor is configured to execute the instructions, and the instructions, when executed, cause the processor to:
receive a file of a first format comprising information and a plurality of regions of interest (ROIs);
convert the file into an image;
generate, using a first model, a first output comprising a first set of information extracted from the image and a first set of coordinates of the first set of information in the image;
generate, using a second model, a second output comprising a second set of coordinates for each ROI of the plurality of ROIs in the image;

generate, using a third model, a third output comprising a second set of information extracted from the image and a third set of coordinates of the second set of information the image;

merge the first output and the third output to generate the information included in the file and a plurality of coordinates, wherein the plurality of coordinates comprise coordinates for the information in the image;

generate an output file of a second format comprising a plurality of sections using the second output, wherein each section of the plurality of sections corresponds to an ROI of the plurality of ROIs, and each section of the plurality of sections is included in the output file based on coordinates of an ROI in the second set of coordinates corresponding to the respective section; and populate each section of the plurality of sections in the output file with a portion of the information determined to correspond with the respective section based on coordinates corresponding with the portion of the information and the coordinates of the respective section, wherein the second format allows the information in the output file to be searchable while it is rendered on a graphical user interface (GUI) or stored in a data storage device.

15. The system of claim 14, wherein the information comprises one or more words and generating the first output or third output comprises generating a bounding box around each of the one or more words in the image.

16. The system of claim 14, wherein the third set of coordinates form a bounding box around each ROI of the plurality of ROIs.

17. The system of claim 14, wherein the first output is generated using optical character recognition (OCR).

18. The system of claim 14, wherein the third output is generated using a neural network.

19. The system of claim 14, wherein the output file is used by one or more machine-learning models to generate a knowledge base.

20. The system of claim 14, wherein the information is selectable in the output file.

21. The system of claim 14, wherein the instructions, when executed, further cause the processor to cause display of the output file and the image.

22. The system of claim 14, wherein the information comprises words and/or images.

23. The system of claim 22, wherein merging the first output with the third output to generate the information, comprises retaining the images included in the first output.

24. The system of claim 22, wherein the instructions, when executed, further cause the processor to:
identify one or more words in the first output that share same coordinates with one or more words in the third output; and
determine a similarity level between the one or more words in the first output and the one or more words in the third output.

25. The system of claim 24, wherein the instructions, when executed, further cause the processor to:
assign a first priority value to the first output and a second priority value to the third output;
include the one or more words from the third output in the plurality of words based on the second priority value of the third output and based on the similarity level being more than a predetermined threshold; and
exclude the one or more words from the first output in the plurality of words based on the first priority value of the first output and based on the similarity level being more than the predetermined threshold.

26. The system of claim 24, wherein the instructions, when executed, further cause the processor to:
identify a first data type of the one or more words in the first output and a second data type of the one or more words in the third output;
include the one or more words from the first output in the plurality of words based on the first data type of the one or more words in the first output; and
exclude the one or more words from the third output in the plurality of words based on the second data type of the one or more words in the third output.

27. A non-transitory machine-readable medium having instructions stored thereon that, when executed by at least one computing device, cause the at least one computing device to perform operations comprising, the operations comprising:
receiving a file of a first format comprising information and a plurality of regions of interest (ROIs);
converting the file into an image;
generating, using a first model, a first output comprising a first set of information extracted from the image and a first set of coordinates of the first set of information in the image;
generating, using a second model, a second output comprising a second set of coordinates for each ROI of the plurality of ROIs in the image;
generating, using a third model, a third output comprising a second set of information extracted in the image and a third set of coordinates of the second set of information the image;
merging the first output and the third output to generate the information included in the file and a plurality of coordinates, wherein the plurality of coordinates comprises coordinates for the information in the image;
generating an output file of a second format comprising a plurality of sections using the second output, wherein each section of the plurality of sections corresponds to an ROI of the plurality of ROIs, and each section of the plurality of sections is included in the output file based on coordinates of an ROI in the second set of coordinates corresponding to the respective section; and
populating each section of the plurality of sections in the output file with a portion of the information determined to correspond with the respective section based on coordinates corresponding with the portion of the information and the coordinates of the respective section,
wherein the second format allows the information in the output file to be searchable while it is rendered on a graphical user interface (GUI) or stored in a data storage device.

28. The non-transitory machine-readable medium of claim 27, wherein the information comprises one or more words and generating the first output or third output comprises generating a bounding box around each of the one or more words in the image.

29. The non-transitory machine-readable medium of claim 27, wherein the third set of coordinates form a bounding box around each ROI of the plurality of ROIs.

30. The non-transitory machine-readable medium of claim 27, wherein the first output is generated using optical character recognition (OCR).

31. The non-transitory machine-readable medium of claim 27, wherein the third output is generated using a neural network.

32. The non-transitory machine-readable medium of claim 27, wherein the output file is used by one or more machine-learning models to generate a knowledge base.

33. The non-transitory machine-readable medium of claim 27, wherein the information is selectable in the output file.

34. The non-transitory machine-readable medium of claim 27, wherein the operations further comprise causing display of the output file and the image.

35. The non-transitory machine-readable medium of claim 27, wherein the information comprises words and/or images.

36. The non-transitory machine-readable medium of claim 35, wherein merging the first output with the third output to generate the information, comprises retaining the images included in the first output.

37. The non-transitory machine-readable medium of claim 35, wherein the operations further comprise:
   identifying one or more words in the first output that share same coordinates with one or more words in the third output; and
   determining a similarity level between the one or more words in the first output and the one or more words in the third output.

38. The non-transitory machine-readable medium of claim 37, wherein the operations further comprise:
   assigning a first priority value to the first output and a second priority value to the third output;
   including the one or more words from the third output in the plurality of words based on the second priority value of the third output and based on the similarity level being more than a predetermined threshold; and
   excluding the one or more words from the first output in the plurality of words based on the first priority value of the first output and based on the similarity level being more than the predetermined threshold.

39. The non-transitory machine-readable medium of claim 37, wherein the operations further comprise:
   identifying a first data type of the one or more words in the first output and a second data type of the one or more words in the third output;
   including the one or more words from the first output in the plurality of words based on the first data type of the one or more words in the first output; and
   excluding the one or more words from the third output in the plurality of words based on the second data type of the one or more words in the third output.

* * * * *

UNITED STATES PATENT AND TRADEMARK OFFICE
CERTIFICATE OF CORRECTION

PATENT NO.        : 12,154,362 B2
APPLICATION NO.   : 17/725313
DATED             : November 26, 2024
INVENTOR(S)       : Mark Salacinski et al.

It is certified that error appears in the above-identified patent and that said Letters Patent is hereby corrected as shown below:

On the Title Page

Item (56) Under the "OTHER PUBLICATIONS":

Column 2 Line 1-9 should read:
"Yang et al. "Learning to Extract Semantic Structure from Documents Using Multimodal Fully Convolutional Neural Networks" IEEE Jul. 21, 2017. Retrieved from https://openaccess.thecvf.com/content_cvpr_2017/papers/Yang_Learning_to_Extract_CVPR_2017_paper.pdf.
Tran et al. "Separation of Text and Non-text in Document Layout Analysis using a Recursive Filter". dated Apr. 14, 2015.
Adobe Inc. "PDF Extract API". retrieved on Sep. 20, 2021, from https://developer.adobe.com/document-services/docs/overview/."

Page 2 Column 1 Line 6-12 should read:
"Patil et al. "READ: Recursive Autoencoders for Document Layout Generation" dated Apr. 16, 2020. from arXiv: 1909.00302v4 [cs.CV]. Retrieved from https://arxiv.org/abs/1909.00302
Oliveria et al. "Fast CNN-based document layout analysis" dated Oct. 22, 2017, IEEE Xplore, retrieved from: https://openaccess.thecvf.com/content_ICCV_2017_workshops/papers/w18/Oliveira_Fast_CNN-Based_Document_ICCV_2017_paper.pdf."

Signed and Sealed this
Twenty-fifth Day of March, 2025

Coke Morgan Stewart
*Acting Director of the United States Patent and Trademark Office*